No. 807,567. PATENTED DEC. 19, 1905.
F. J. MAYWALD.
PROCESS OF EXTRACTING OIL, GREASE, AND THE LIKE FROM OIL BEARING MATERIAL.
APPLICATION FILED OCT. 6, 1902. RENEWED APR. 26, 1905.
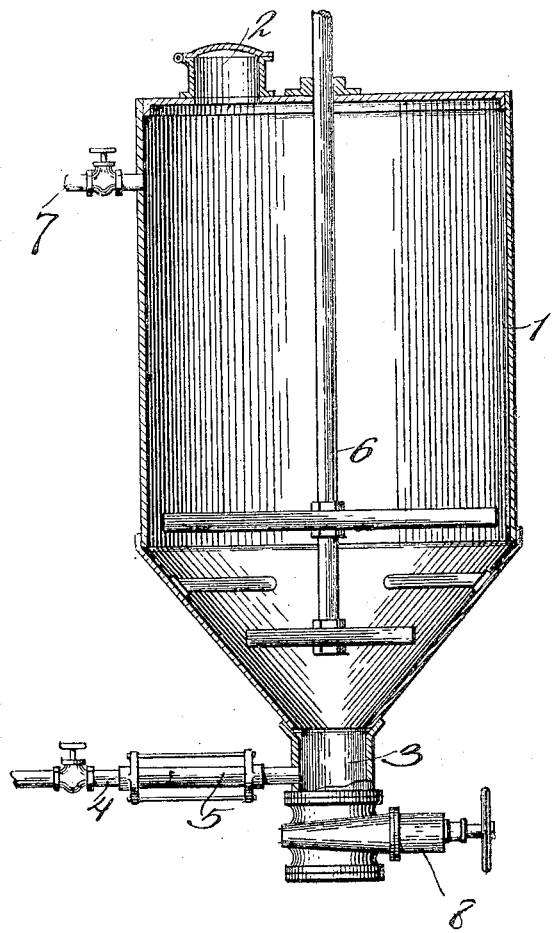
WITNESSES:
INVENTOR
Frederick J Maywald
BY
ATTORNEYS

UNITED STATES PATENT OFFICE.

FREDERICK J. MAYWALD, OF NEW YORK, N. Y., ASSIGNOR TO EDWARD H. FALLOWS, OF NEW YORK, N. Y.

PROCESS OF EXTRACTING OIL, GREASE, AND THE LIKE FROM OIL-BEARING MATERIAL.

No. 807,567.  Specification of Letters Patent.  Patented Dec. 19, 1905.

Application filed October 6, 1902. Renewed April 26, 1905. Serial No. 257,428.

*To all whom it may concern:*

Be it known that I, FREDERICK J. MAYWALD, a citizen of the United States, residing in the city of New York, borough of Brooklyn, and State of New York, have invented certain new and useful Improvements in Processes for Extracting Oil, Grease, and the Like from Oil-Bearing Material; and I do hereby declare the following to be a full, clear, and exact description of the invention, such as will enable others skilled in the art to which it appertains to make and use the same.

My invention relates to improvements in separating and extracting oil, grease, and the like from materials floating in or held in suspension in water or other liquid; and my invention is particularly applicable to the extraction of oil and grease from animal and vegetable matter—such, for instance, as slaughter-house material, fish and fish-waste, garbage, and the like after the same have been subjected to digestion to liberate the oil and grease from the fibrous and cellular structures in which the same are contained and from tankage. It is also applicable to the extraction of oil from boiler-feed water.

My invention consists, essentially, in adding carbon tetrachlorid ($CCl_4$) to liquid containing oil or grease or to a mass of oil or grease bearing material floating in or in suspension in water or other liquid of less specific gravity than the carbon tetrachlorid and permitting the carbon tetrachlorid to descend through the mass of material treated, which it will do by reason of its greater specific gravity, and to collect in the lower portion of the vessel in which the treatment is conducted. In so passing down through the mass treated the carbon tetrachlorid will dissolve the oil and grease present in the mass, carrying the same down with it. The carbon tetrachlorid may be drawn off as or after it collects, as just described, and the oil and grease extracted by distillation.

This process is rendered possible by the fact that carbon tetrachlorid has relatively great specific gravity—namely, about 1.6—so that it separates readily from water and lighter liquids by difference in specific gravity alone, even when it carries a large amount of oil and grease in solution. It is therefore much easier to separate carbon tetrachlorid from a mass of material such as above described than it is to separate naphtha (the solvent heretofore usually employed for the purpose) from such a mass, and in addition carbon tetrachlorid has the further great advantage that it is non-inflammable either as a liquid or as a vapor, whereas the inflammability of naphtha constitutes a serious and in many cases a prohibitive objection to its use in the extraction of oil and grease. Furthermore, carbon tetrachlorid is not injurious to the human system and has no disagreeable odor.

The object of my invention is to extract oil, grease, and the like from oil-bearing material in a simple, rapid, and economical manner without danger of fire and without discomfort or danger to persons in proximity to the apparatus.

In carrying out my invention the treatment is preferably conducted in a closed vessel provided with means for digesting its contents and with suitable taps or the like for drawing off the carbon tetrachlorid with the oil and grease in solution therein from the bottom of the vessel. The material to be treated having been placed in such a vessel and the carbon tetrachlorid having been added in suitable quantities the contents of the vessel are preferably agitated, thus bringing the carbon tetrachlorid into intimate contact with the oil and grease bearing material. The contents of the vessel are then allowed to settle, whereupon the carbon tetrachlorid, with oil and grease in solution therein, will quickly separate from the water and solid residue because of its relatively great specific gravity and its comparatively slight viscosity, falling to the bottom of the vessel, while the water and solid residue rises above the same. The carbon tetrachlorid may then be drawn off from the vessel and separated from the oil, grease, and the like which it carries in solution in any suitable manner—as, for example, by distillation and condensation. Because of its low boiling-point it is easy to separate carbon tetrachlorid from the materials which it carries in solution and from any water which may be carried over with it by distillation.

In the accompanying drawing I illustrate diagrammatically an apparatus which may be used for the above treatment. Such an apparatus consists of a closed vessel 1, having a charging-opening 2 at its top and a discharge outlet or passage 3 at its bottom. A pipe 4 for drawing off the tetrachlorid may be connected to this outlet-passage, and in this pipe there may be a glass sight-tube 5. The vessel may be provided with a mechanical agitator 6. Such a vessel may also be used for carrying on the preliminary-digestion process such as is now commonly used in the extraction of oil and grease. In such case after the digestion is complete and after so much of the oil and grease as can be removed without the use of a solvent has been removed carbon tetrachlorid is admitted to the vessel through a pipe 7 or in any other suitable way and is mixed with the fluid and solid contents of the vessel by means of the agitator. The contents of the vessel are then allowed to separate, whereupon the carbon tetrachlorid will quickly collect in the lower portion of the vessel and in the discharge-passage 3, which at that time is closed by means of its valve 8. The carbon tetrachlorid may be drawn off through the pipe 5, the progress of the operation being watched through the window 4, and the appearance of any solid matter at this window indicates that the carbon tetrachlorid has been drawn off, since the solid matter present will float on the surface of the carbon tetrachlorid. In this way substantially all of the carbon tetrachlorid may be drawn off, there being little or no waste.

Apparatus for separating the carbon tetrachlorid from the oil and grease in solution therein by distillation is not shown or described, since distilling apparatus for similar purposes is well known.

The use of the closed vessel for carrying out the above process prevents annoyance from the offensive fumes which the material treated often gives off.

What I claim is—

1. The herein-described process of separating and extracting oil, grease, and the like from water or similar liquid and from material floating in, or in suspension in, water or similar liquid, which consists in adding carbon tetrachlorid to the mass and permitting the same to descend therethrough and separate therefrom by difference in specific gravity.

2. The herein-described process of separating and extracting oil, grease, and the like from water or similar liquid and from material floating in, or in suspension in, water or similar liquid, which consists in adding carbon tetrachlorid to the mass and permitting the same to descend therethrough and separate therefrom by difference in specific gravity, drawing off the carbon tetrachlorid, and then separating the same from the oil, grease and the like in solution therein by distillation.

In testimony whereof I affix my signature in the presence of two witnesses.

FREDERICK J. MAYWALD.

Witnesses:
HARRY M. MARBLE,
D. HOWARD HAYROOD.